United States Patent [19]

Olive

[11] Patent Number: 5,338,200
[45] Date of Patent: Aug. 16, 1994

[54] METHOD AND APPARATUS FOR GENERATING AN ELLIPTICAL IMAGE

[75] Inventor: Graham J. Olive, Burgess Hill, United Kingdom

[73] Assignee: Rediffusion Simulation Limited, Sussex, United Kingdom

[21] Appl. No.: 934,483

[22] PCT Filed: Apr. 15, 1991

[86] PCT No.: PCT/GB91/00589

§ 371 Date: Sep. 15, 1992

§ 102(e) Date: Sep. 15, 1992

[87] PCT Pub. No.: WO91/16700

PCT Pub. Date: Oct. 31, 1991

[30] Foreign Application Priority Data

Apr. 24, 1990 [GB] United Kingdom ............. 9009127.3

[51] Int. Cl.$^5$ .................. G09B 9/08; G09B 19/16
[52] U.S. Cl. ....................... 434/43; 434/307; 273/434; 395/119; 395/127; 345/133
[58] Field of Search ............ 434/29, 43, 69, 307, 434/308, 365; 273/85 G, 434, DIG. 28; 340/723, 729, 747; 395/120, 121, 126, 127, 119, 129, 130, 131, 141; 358/104; 345/133, 112

[56] References Cited

U.S. PATENT DOCUMENTS

| | | |
|---|---|---|
| 4,677,576 | 6/1987 | Berlin, Jr. et al. |
| 4,714,428 | 12/1987 | Bunker et al. ............. 434/43 |
| 4,885,702 | 12/1989 | Ohba ............. 395/119 |
| 4,918,625 | 4/1990 | Yan . |
| 4,928,250 | 5/1990 | Greenberg et al. ............. 395/126 |
| 4,974,177 | 11/1990 | Nishiguchi ............. 395/127 X |
| 4,999,789 | 3/1991 | Fiasconaro ............. 395/127 |
| 5,003,498 | 3/1991 | Ota et al. ............. 395/127 X |

FOREIGN PATENT DOCUMENTS 0240608 10/1987 European Pat. Off. .
8906031 6/1989 World Int. Prop. O. .

OTHER PUBLICATIONS

"Computer Graphics Using Multi-Echelon Processing Structures" by S. Boinodiris, IBM Technical Disclosure Bulletin, vol. 23, No. 9, Feb. 1981, pp. 3996-4005.
"Computer Image Generation", edited by B. J. Schachter, published by John Wiley & Sons Inc. 1983, ISBN-471-87287-3.

Primary Examiner—Richard J. Apley
Assistant Examiner—Joe H. Cheng
Attorney, Agent, or Firm—Nixon & Vanderhye

[57] ABSTRACT

Elliptical features are described in an image generator database in terms of an origin and major and minor axes defined by reference to a world or model space coordinate system. Image data is assembled for display by transforming the database contents into screen space and assessing for each of an array of sampling points distributed across screen space which features are to contribute to the portion of a final image in which the sampling point is located. In the case of elliptical features, data is transformed into eyepoint space and each sampling point is projected into eyepoint space to determine the point of intersection between a line drawn through the sampling point from the eyepoint and a plane defined by the axes. The coordinates of the intersection point in a coordinate system defined by the origin and axes, are used to determine whether or not the feature contributes to the sampling point.

8 Claims, 14 Drawing Sheets

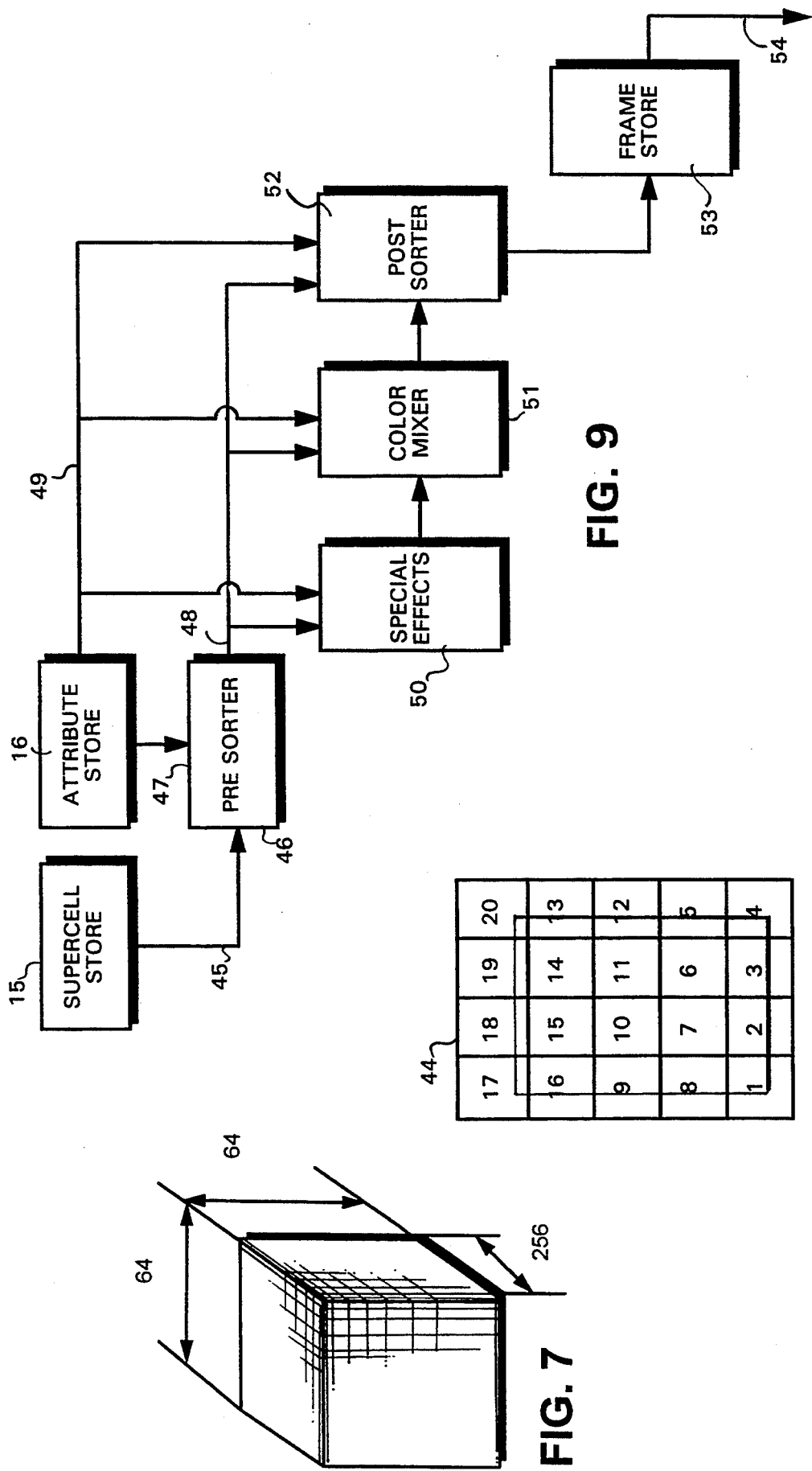

METHOD AND APPARATUS FOR GENERATING AN ELLIPTICAL IMAGE

BACKGROUND OF THE INVENTION

1. Field of the Invention

The present invention relates to an image generator, and in particular to a computer image generator suitable for generating information in real time from which an image can be derived for display in for example a flight simulator.

2. Related Art

Real time image generators for flight simulators are used to simulate images which are presented to pilots who are positioned in a mock aircraft cockpit. The intended viewer of the image produced by the system, that is the simulator "pilot", looks out through an imaginary window into a three-dimensional (3-D) world defined by information stored as geometrical and other characteristic attribute data in a main database. A line drawn from the eyepoint through the window intersects a point in the 3-D world. The colour and intensity of that point must be "painted" on the window at the point of intersection of that line with the window.

The displayed image is made up from a series of picture elements (pixels) each of which is of uniform colour and intensity, the colour and intensity of each pixel being a function of the position of the eyepoint relative to the 3-D world which the stored data represents. In a real time display where hundreds of thousands of pixels must be updated sufficiently quickly to avoid jumping of the image, it is necessary to perform many millions of calculations per second to maintain image fidelity.

The position of the eyepoint, relative to the database changes over time in response to the manipulation of the flight controls of the simulated aircraft. At any point in time the simulator produces an output indicating the eyepoint position in world space coordinates, that is the coordinate system of the database, and indicating the viewing direction, that is a vector drawn from the pilot's eyepoint through the centre of the viewing window. The database stores data identifying the position and orientation of a large number of features that may contribute to the final image. The image generator calculates which of the features is visible for the given eyepoint, the position of the boundaries of the features relative to the viewing window, and the attributes such as colour and intensity of the visible features. Occultation of one feature by another must be taken into account, and in high quality systems the effects of one translucent feature occulting another must also be taken into account.

The content of the database is used to derive the colour and intensity information for each pixel of the image to be displayed on a screen placed in front of the simulator pilot. The centre of each pixel is on a unique predetermined imaginary viewing line extending from the eyepoint to the screen and notionally extending through the screen onto the surface of the model defined in the database. This means that the world space coordinate system of the database must be transformed using the eyepoint coordinates into a coordinate system having the eyepoint as its origin, that is an eyepoint space coordinate system, and the information must then be transformed from eyepoint space into a screen space coordinate system. The screen space coordinate system is two dimensional, having its origin at the centre of the display screen. These transformations enable the surface areas of the modelled features which determine the colour and intensity of each pixel (for which the screen space coordinates are known) to be determined. Once the features contributing to a particular pixel have been identified, the colour, intensity and other attributes of those features can be obtained from the database and appropriate calculations performed to determine the final displayed colour and intensity of the pixel.

If a high quality image is to be achieved, the final pixel colour and intensity must be based on a number of samples of the contributing features taken at sampling points distributed across each pixel. For each feature making a contribution to an image it is necessary to determine whether or not that feature overlaps each point in screen space corresponding to a sampling point. Thus it is fundamental to the operation of the image generator to be able to determine the boundaries of a feature in screen space relative to the position of each of a relative large number of sampling points.

In most known CIG systems, the world space model is defined as a series of polygonal features. Light point features can also be displayed in some systems. In the case of polygonal features, each polygon is described in the database by the world space coordinates of at least its vertices, and these geometrical attributes must be transformed into screen space coordinates to take account of the position and orientation of the eyepoint. This involves an initial world space to viewpoint space transformation, followed by a viewpoint space to screen space transformation. The transformations are computationally intensive operations but do enable realistic images to be displayed. In the case of a lightpoint feature, it may be described in the database by for example a position in world space. The position is transformed to screen space, and the feature can then be displayed on a circular area of the screen centred on the transformed position and having a radius corresponding to a computed size. Lightpoint features, providing they occupy only a relatively small area of screen space, can be adequately represented in this way as screen space circles. In the case of larger features which in world space are circular or elliptical, e.g. helipad markings, vehicle wheels, or fuel storage tanks, screen space circles or ellipses cannot provide image realism as correct perspective cannot be maintained.

The conventional approach to simulating the appearance of world space ellipses in screen space is to model each elliptical surface in the database as a multisided polygon defined with reference to world space coordinates. The greater the number of sides, the less apparent are the discontinuities alone the boundary of the ellipse. Thus, world space ellipses can be displayed in screen space using conventional techniques, but only at the expense of increasing the number of vertices/edges, each of which must be separately transformed to screen space coordinates and then processed to define its position relative to screen space sampling points. Increasing the number of vertices and edges to be processed increases the time taken to process one image using a given fixed computational resource. Thus in real time systems where there is a fundamental limit to the maximum acceptable time taken to produce one image it is highly undesirable to increase the number of polygon edges used in the model.

A review of the problems confronted in real time CIG systems and various approaches to solving these problems is given in the publication "Computer Image

BRIEF SUMMARY OF THE INVENTION

It is an object of the present invention to obviate or mitigate the problems outlined above with regard to the production of images in which elliptical features rendered in the image behave correctly with regard to perspective without it being necessary to break elliptical features into a series of straight-sided sub-features.

According to the present invention there is provided a method for generating data representative of an image of a world space model to be displayed on a screen, the model being defined by a plurality of features including at least one feature having an elliptical boundary, and the image being intended to present a view of the model from a predetermined eyepoint in world space, wherein a. attribute data describing the said at least one feature is stored, the attribute data including two axes and an origin describing the major and minor axes of the elliptical boundary in world space coordinates.

b. the said attribute data is transformed from world space coordinate to eyepoint space coordinates, c. the positions of a plurality of sampling points in screen space are determined, d. for each sampling point, the position is determined of a point of intersection between a line drawn from the eyepoint through the sampling point and a plane defined by the said two axes, e. the coordinates of each said point on the plane defined by the two axes are calculated in a coordinate system defined by the said two axes and origin, f. from the calculated coordinates, each sampling point for which the respective coordinates lie within the elliptical boundary is identified, and g. for each identified sampling point, a sampling point output is generated including attributes of the said at least one feature.

The present invention also provides an image generator for generating data representative of an image of a world space model to be displayed on a screen, the model being defined by a plurality of features including at least one feature having an elliptical boundary, and the image being intended to present a view of the model from a predetermined eyepoint in world space, wherein the image generator comprises:

a. means for storing attribute data describing a set of at least one feature, the attribute data including two axes and an origin describing the major and minor axes of the elliptical boundary in world space coordinates, b. means for transforming the said attribute data from world space coordinates to eyepoint space coordinates, c. means for determining the position of a plurality of sampling points in screen space, d. means for determining, for each sampling point, the position of a point of intersection between a line drawn from the eyepoint through the sampling point and a plane defined by the said two axes, e. means for calculating the coordinates of each said point on the plane defined by the two axes in a coordinate system defined by the said two axes and origin, f. means for identifying from the calculated coordinates each sampling point for which the respective coordinates lie within the elliptical boundary, and g. means for generating for each identified sampling point a sampling point output including attributes of the said at least one feature.

The screen may be divided into a plurality of sub-areas, and attribute data describing the vertices in world space of a polygon circumscribing the elliptical feature may be stored. The stored vertices are then transformed into screen space coordinates, and sub-area coverage by the feature is assessed by reference to the screen space coordinates of those vertices. The vertices may be used to derive a bounding box and the feature may be conservatively assessed as not covering any sub-area which is not overlapped by that bounding box.

Screen space vertices for an inscribed polygon may also be calculated, each vertex of the polygon lying on the elliptical boundary of the feature. Line equations describing the edge of the inscribed polygon are derived, and the position of each corner of a sub-area of the screen relative to each edge of the inscribed polygon is determined. A feature is identified as fully covering the sub-area only if each corner of the sub-area is within the sub-area defined by the inscribed polygon edges.

BRIEF DESCRIPTION OF THE DRAWINGS

An embodiment of the present invention will now be described, by way of example, with reference to the accompanying drawings, in which:

FIG. 7 illustrates the functional structure of the store of FIG. 6;

FIG. 8 illustrates the relative disposition of the boundaries of sub-areas of screen space relative to a bounding box for a feature;

FIG. 9 is a schematic illustration of basic components of the rendering engine described in outline with reference to FIG. 1;

DETAILED DESCRIPTION OF EXEMPLARY EMBODIMENTS

Figure 1:
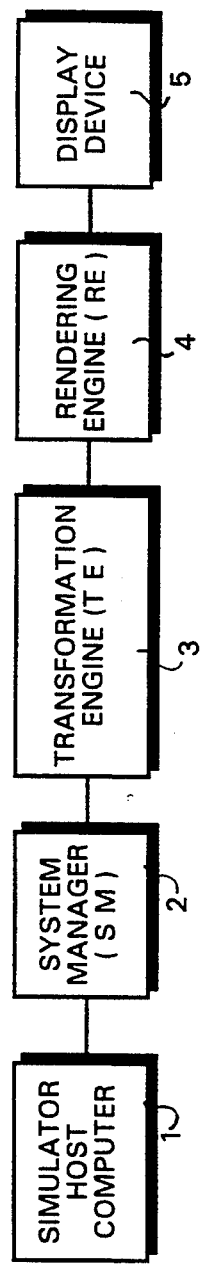
FIG. 1 is a schematic illustration of the basic configuration of a CIG system in accordance with the present invention.

Referring to FIG. 1, this illustrates the basic functional components of an embodiment of the present invention adapted for use in a flight simulator. The simulator incorporates a host computer 1 which provides outputs corresponding to the position and attitude of the simulated aircraft relative to a world space model of the earth surface. An image is to be displayed which is representative of the appearance of the model surface to an observer in the simulated aircraft. In the described embodiment, the image is projected onto a back projection screen. The observer views the reflection of the back projection screen in a large spheroidal mirror. It will be appreciated however that alternative display systems may be used.

A system manager (SM) 2 receives the outputs of the host computer 1 describing the aircraft position and attitude and downloads from a database model-describing data corresponding to those portions of the model which are potentially visible from the observer's eyepoint given the position and attitude of the simulated aircraft. The image is projected as a plurality of raster scanlines. Calligraphic lightpoints could be superimposed on the image raster but the processing of calligraphic lightpoints is not relevant to the present invention and therefore will not be described further herein.

The model-describing data is predetermined during model production but will describe features of the model scene, for example runways, buildings and fields, in terms related to a set of worldspace coordinates with a predetermined origin. The model may include a variety of different feature types, for example straight edged polygonal features, circular lightpoints and elliptical (including circular) features. The present invention is concerned with the correct display of features which are elliptical in worldspace coordinates and therefore the processing of other feature types will not be described further herein. It will be appreciated however that in most modelled scenes the majority of features will be polygonal and these features will be processed by the same equipment as is used to process elliptical features.

The model describing data is hierarchically ordered such that most individual features of the model are defined by reference to objects of which they form a part, and those objects are in turn defined by reference to other objects in the model. Thus the model world will generally define a feature in "object space", that is with reference to a coordinate system having its origin and axes related to an object such as a building. The coordinate system of that object is then referenced to world space coordinates either directly or through one or more further objects. The term "world space coordinates" is used herein to include both direct reference to the coordinate system of the main database and indirect reference to the coordinate system of the main database through one or more "object spaces".

The extracted model-describing data is passed to a transformation engine (TE) 3 which performs two main functions. that is geometric transformation of model feature data from the database or world space coordinate system to the observers or eyepoint coordinate system, and perspective transformation from the 3-D eyepoint coordinate system to a 2-D screen space coordinate system. The techniques used to achieve such transformations are well known and accordingly are not elaborated in detail here.

The TE 3 provides a stream of model-describing data in screen coordinates to a rendering engine (RE) 4. The RE 4 performs a number of functions using model feature geometric attribute data (e.g. size and position) and model feature non-geometrical attribute data (e.g. colour, translucency) received from the TE 3 to produce a final colour for each pixel of the image to be displayed. Data representing the non-geometrical attribute data is loaded into a frame store within the RE 4, the frame store having a storage address in respect of each pixel in the final display. The contents of the frame store are down loaded to display device 5 which produces the final image. The system thus has four main pipeline stages; such that as one image frame is being displayed, the next frame to be displayed is being rendered in the RE 4, the next but one frame to be displayed is being processed in the TE 3, and the next bus two frame to be displayed is being processed in the SM 2. Each stage is separated from the or each adjacent stage by a double buffered store. A frame swap signal is generated to cause all the double buffered stores to swap in unison. Thus data relevant to one frame is effectively "clocked" through the pipeline by the frame swap signal.

Figure 2:
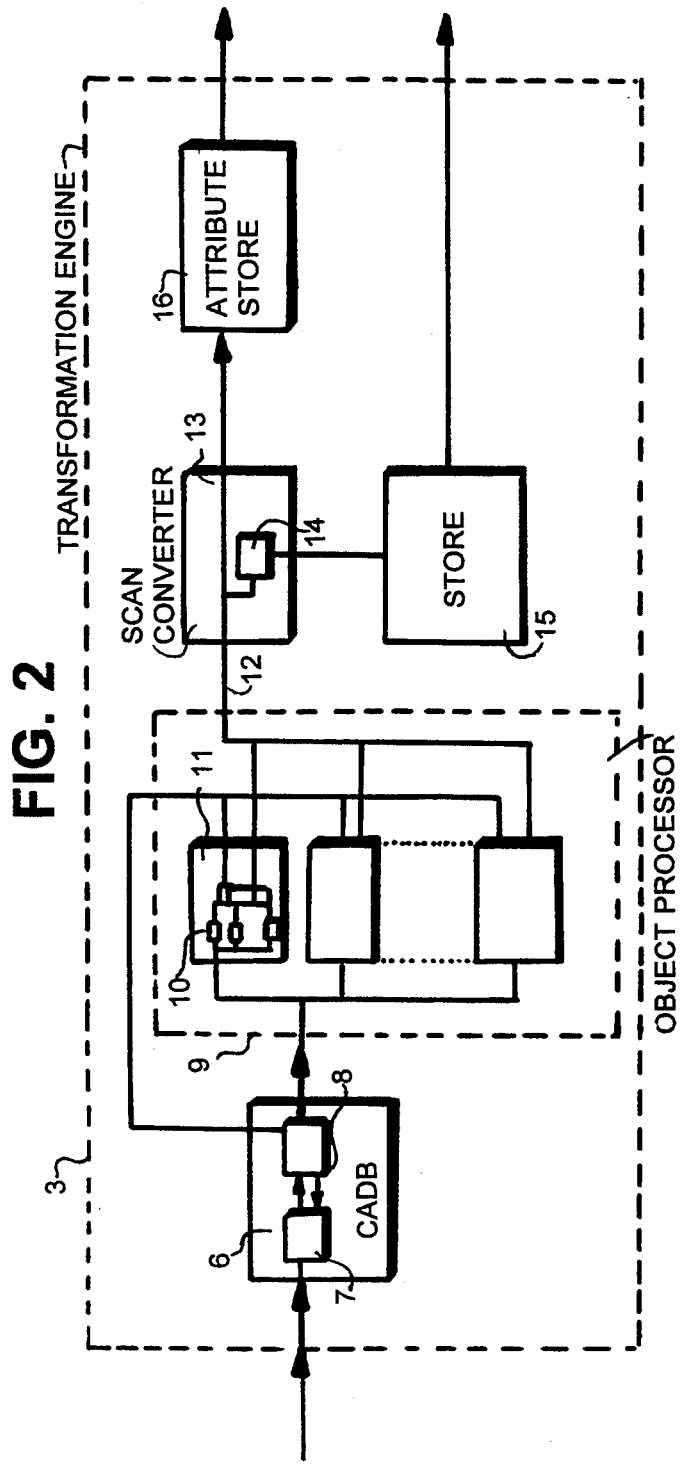
FIG. 2 is a schematic illustration of a transformation engine suitable for use in a system of the type illustrated generally in FIG. 1.

FIG. 2 illustrates the TE 3 of FIG. 1 in more detail. The TE processes data previously read out from the SM 2 into a channel active database (CADB) 6. The contents of the CADB 6 corresponds to all the data within the main database which is within potentially visible range of the eyepoint. The CADB 6 comprises a memory 7 and control logic 8 which controls the read out data from the memory to an array of object processors 9 that in turn provides control inputs to the control logic 8. The memory 7 holds the entire active database and the control logic 8 selects object data for processing. The object processor array 9 comprises individual object processors 10 arranged in groups on respective boards 11. These processors form the main computational element of the TE 3.

A common output 12 of the object processor array 9 is delivered to a scan converter 13 incorporating a logic unit 14 providing an output to a scan converter store 15. An attribute store 16 receives input via the scan converter 13. The stores 15 and 16 provide the outputs of the TE 3 to the rendering engine RE 4.

The object processors 10 perform a variety of functions, including controlling the distribution of data to the object processors in an efficient manner, performing a range cull to discard all objects which are at a range too great for them to be visible from the eyepoint, and performing a field of view cull to discard all objects which are completely outside the field of view given by the position of the viewing window or screen relative to the eyepoint. For all features not culled in this processing, the geometrical attributes must be processed. This processing involves five basic procedures, that is backface removal (culling all features that cannot be seen from the eyepoint as they face away from the eyepoint), plane equation attribute calculation (using the coefficients of the plane in eyepoint space of each feature that is potentially visible), field of view culling (culling all features which are completely outside the field of view represented by the viewing window), bounding box calculations (the maximum or minimum screen space extents of each feature), and line equation calculations (the calculation in screen space of equations describing lines defining the basic geometry of the features being processed). Before these processes are described in further detail it is appropriate to explain the basic geometrical attributes assigned to the various features which are to be processed.

Modelled features

In the world space model, there are various different types of features, including quadrilateral polygons and ellipses. The geometrical attributes of elliptical features include origin (centre of ellipse), major and minor axes, four vertices defining a circumscribing polygon, and the surface normal, all defined with reference to world space coordinates. The geometrical attributes of other feature types will not be described herein as they are not directly relevant to the present invention. It will be appreciated that in most images the majority of features contributing to that image will not be elliptical but that the interrelationship between all feature types will be taken into account in the final image. The following description discusses only the processing of elliptical features but it will be appreciated that other feature types can be readily processed by equipment of the general type described.

Figure 3:
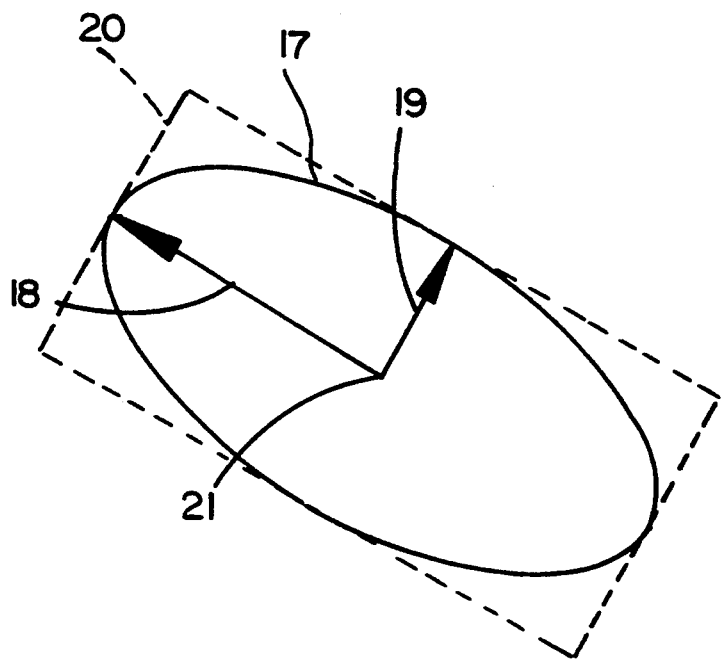
FIGS. 3 and 4 illustrate the derivation of line equations which are used to assess the position of features in screen space in the embodiment of the present invention.

FIG. 3 illustrates a plan view of an elliptical feature having a boundary 17, a major axis 18, and a minor axis 19. Broken line 20 indicates a circumscribing polygon which is rectangular and the edges of which pass through respective intersection points between the ellipse boundary 17 and the two axes. The axes 18 and 19 intersect at an origin 21 the position of which is defined in world space coordinates. The axes 18 and 19 are themselves defined by vectors described in terms of world space coordinates. Thus the elliptical feature has a defined position in world space, a surface normal, and four vertices corresponding to the corners of the circumscribing polygon 20 which defines an area within which all of the ellipse is enclosed.

The object processors initially, perform backface removal and plane equation attribute calculations for elliptical features. These processes are described below:

Backface removal

The object processor starts feature processing with backface removal. For each feature, the surface normal is rotated into eyepoint space and a control vertex on the feature is rotated and translated into eyepoint space. This produces plane equation coefficients (A, B, C) and control vertex coordinates ($x_c$, $y_c$, $z_c$) These are substituted in the plane equation:

$$Ax + By + Cz = -D$$

to yield "$-D$". Backfacing planes (which face away from the eyepoint space origin) have a positive value for "$-D$" and are culled. This effectively discards all backfacing features.

Plane Equation Attributes Calculation

For all surviving features. "$-D$" is normalized to:

$$-2.0 > D > = 1.0$$

and used to produce the following attributes:
A/D.kx
B/D.ky
C/D kx and ky are constants which relate the attributes to the size and aspect ratio of the screen on which the image is to be displayed. If the pixels are square, kx=ky.

The plane equation attributes are passed to the scan converter and are constant for each field.

Bounding Box Calculations

Figure 4:
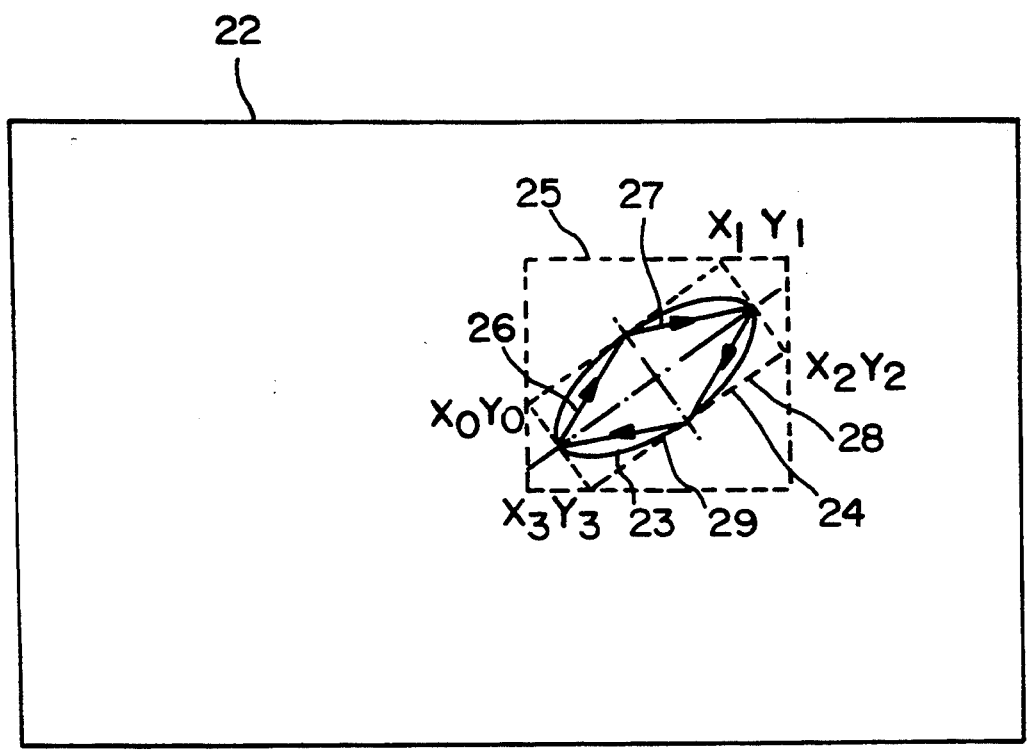

Referring to FIG. 4, the right-hand portion of this Figure labelled illustrates a possible derivatiion of a "bounding box" for an elliptical feature, the bounding box representing the full range of screen space coordinate values which might lie within the circumscribing polygon 20 of FIG. 3. In FIG. 4, the rectangle 22 is intended to represent the screen periphery, the line 23 represents the area occupied by the ellipse of FIG. 3 within the screen, a rectangle indicated by broken line 24 corresponds to the circumscribing polygon 20 of FIG. 3, and the rectangle indicated by broken line 25 represents the bounding box for the elliptical feature.

To derive the equations of the lines defining the bounding box 25, it is necessary to transform the vertices of the circumscribing polygon 20 of FIG. 3 from world space coordinates into screen space coordinates. In FIG. 4, the screen space coordinates of the vertices are indicated as ($x_0$, $Y_0$), ($x_1$, $y_1$), ($x_2$, $y_2$) and ($x_3$, $y_3$). Thus the bounding box edges are as follows:

| | | |
|---|---|---|
| Left | x | = $x_0$ |
| Right | x | = $x_2$ |
| Top | y | = $y_1$ |
| Bottom | y | = $y_3$ |

The bounding box is thus defined by four line equations:

$$x - x_0 = 0$$

$$x_2 - x = 0$$

$$y_1 - y = 0$$

$$y - y_3 =$$

Or in general:

$$x - L = 0$$

$$R - x = 0$$

$$T - y = 0$$

$$y - B = 0$$

Where L, R. T and B are left, right, top and bottom extents respectively of the bounding box.

Thus a bounding box for any elliptical feature can be derived. It will be appreciated that this bounding box is generally larger than the optimum bounding box but it can be easily derived without much computational effort in a way which ensures that the bounding box is at least large enough to enclose all of the feature. It will be appreciated that other methods of finding a bounding box can be used to obtain either the optimum bounding box or a close approximation thereto, subject only to the computational load resulting from the use of such alternative methods not being excessive.

Line Equation Calculations

Referring again to FIG. 4, lines 26 to 29 indicate edges of an inscribed polygon, the vertices of which correspond with the points of intersection between the axes 18 and 19 and the line 17 of FIG. 3. It will be noted that the inscribed polygon lies wholly within the boundary of the elliptical feature. It is necessary to calculate line equation coefficients for the edges of the inscribed polygon for reasons described below.

Assuming that the line 26 extends from screen space coordinates $x_4$ $y_4$ to $x_5$ $y_5$, the calculation of the line equation:

$$e.x + f.y = -g \text{ is as follows:}$$

e from the normalized line equation can be derived from the following:

$$e = (y_5 - y_4)/\text{sqrt} [(y_5 - y_4)^2 + (x_5 - x_4)^2]$$

f from the normalized line equation can be derived from the following:

$$f = (x_4 - x_5)/\text{sqrt} [(y_5 - y_4)^2 + (x_5 - x_4)^2]$$

Thus e and f can be readily calculated, and g can be readily calculated by substituting the calculated e and f values and the coordinates of either vertex into the line equation. Thus the line equation coefficients can be readily derived simply from knowledge of the vertices of the inscribed polygon. These vertices can be derived in turn by transformation from world space coordinates to screen space coordinates of the points of intersection between the axes 18 and 19 and the line 17 of FIG. 3.

The signs of both the inscribed polygon and bounding box edge equation coefficients are formulated so that the set of polygon edges and the set of bounding box edges each form a close string of connected vectors running in the clockwise direction.

Once the object processor has completed the processing of a feature, the attributes (including edge coefficients and bounding boxes) are output to the scan converter. The function of the scan converter is to review the screen coordinate geometrical data of each feature received from the object processors and to decide whether or not that feature is potentially relevant to one or more of a series of areas into which the screen area is divided. Before describing the operation of the scan converter, the way in which the screen is divided into sub-areas for processing purposes in the rendering engine will be described with reference to FIG. 5.

Subdivision of Display Screen

Figure 5:
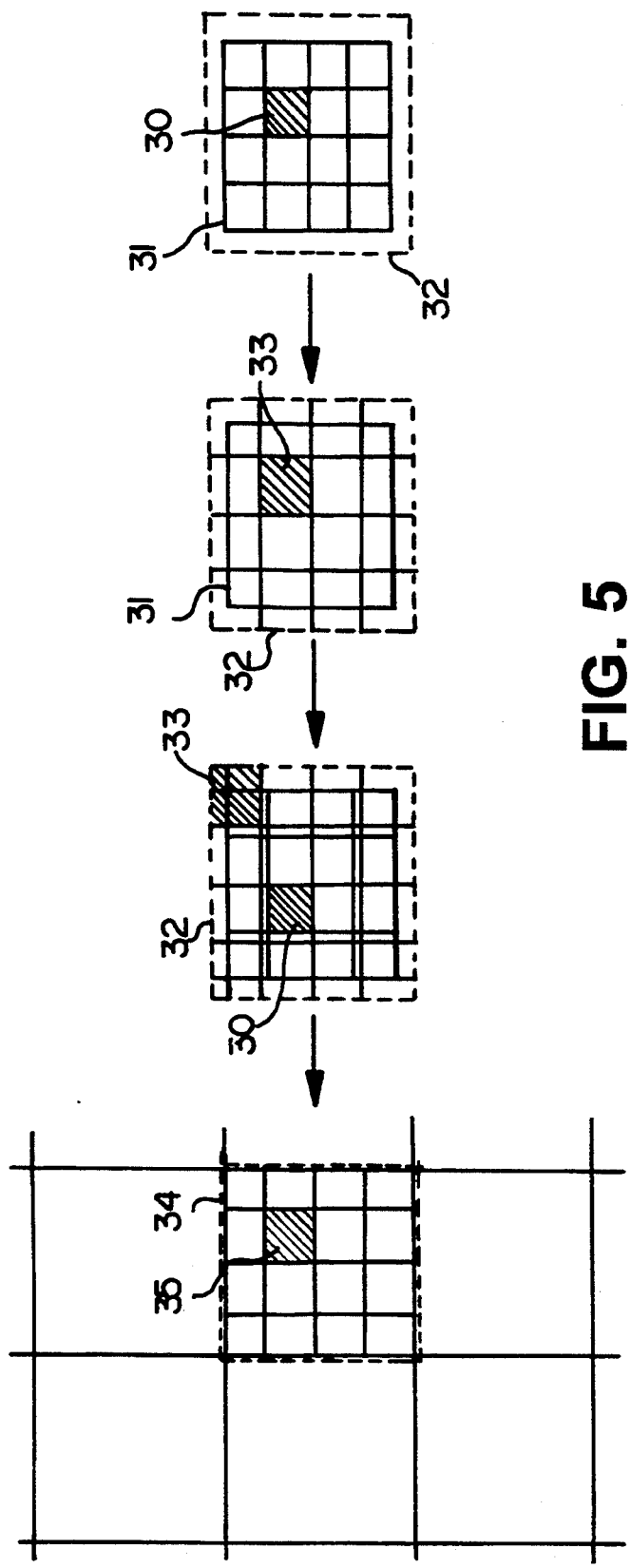
FIG. 5 illustrates the inter-relationship between various sub-areas of screen space in the embodiment of the present invention.

The displayed image is made up from a regular array of pixels which do not overlap and which together cover all of the screen. Each pixel is projected by the raster scan display device as an area of uniform colour and intensity. FIG. 5 includes four illustrations of various subdivisions of the screen, the leftmost illustration being to one quarter of the scale of the three other illustrations.

In FIG. 5, the shaded areas identified by reference numeral 30 each correspond to one pixel. The screen is divided into sub-areas or cells each covering a respective rectangular array of pixels, in the illustrated case a four by four array. Numeral 31 in FIG. 5 points to the boundary of one cell. Adjacent cells do not overlap. Superimposed on each cell is a pseudocell which covers the respective cell and a half pixel boundary around that cell. Broken lines 32 in FIG. 5 correspond to a pseudocell boundary. Thus adjacent pseudocells overlap each other. Each pseudocell is divided into a regular array of abutting pseudopixels, e.g. a four by four array of pseudopixels. The shaded areas 33 in FIG. 5 each correspond to one pseudopixel. Superimposed on the pseudocells are supercells, each covering a respective rectangular array of pseudocells, e.g. a four by four array of pseudocells in the illustrated case. Thus adjacent supercells overlap each other. The broken line 34 indicates a supercell boundary, and shaded area 35 one pseudocell within that supercell. Thus each supercell covers sixteen pseudocells, and those sixteen pseudocells together cover sixteen cells plus a half pixel wide boundary around the edge of those sixteen cells. It is necessary for adjacent supercells, adjacent pseudocells and adjacent pseudopixels to overlap to achieve anti-aliasing as described below.

For the illustrated case of a four by four pixel cell, and a four by four pseudocell supercell, and assuming a display area of 1024 by 1024 pixels, there are $64 \times 64$ supercells and $256 \times 256$ pseudocells.

Scan Converter

For each feature delivered to the scan converter by the object processors, the scan converter identifies all of the supercells which are at least partially overlapped by that feature. For elliptical features, only the bounding box edges are processed in the scan converter.

The scan converter assigns an identity (ID) to each feature, locates the supercells impacted by that feature, and passes the feature ID to the scan converter store 15 (hereinafter referred to as the supercell store).

Figure 6:
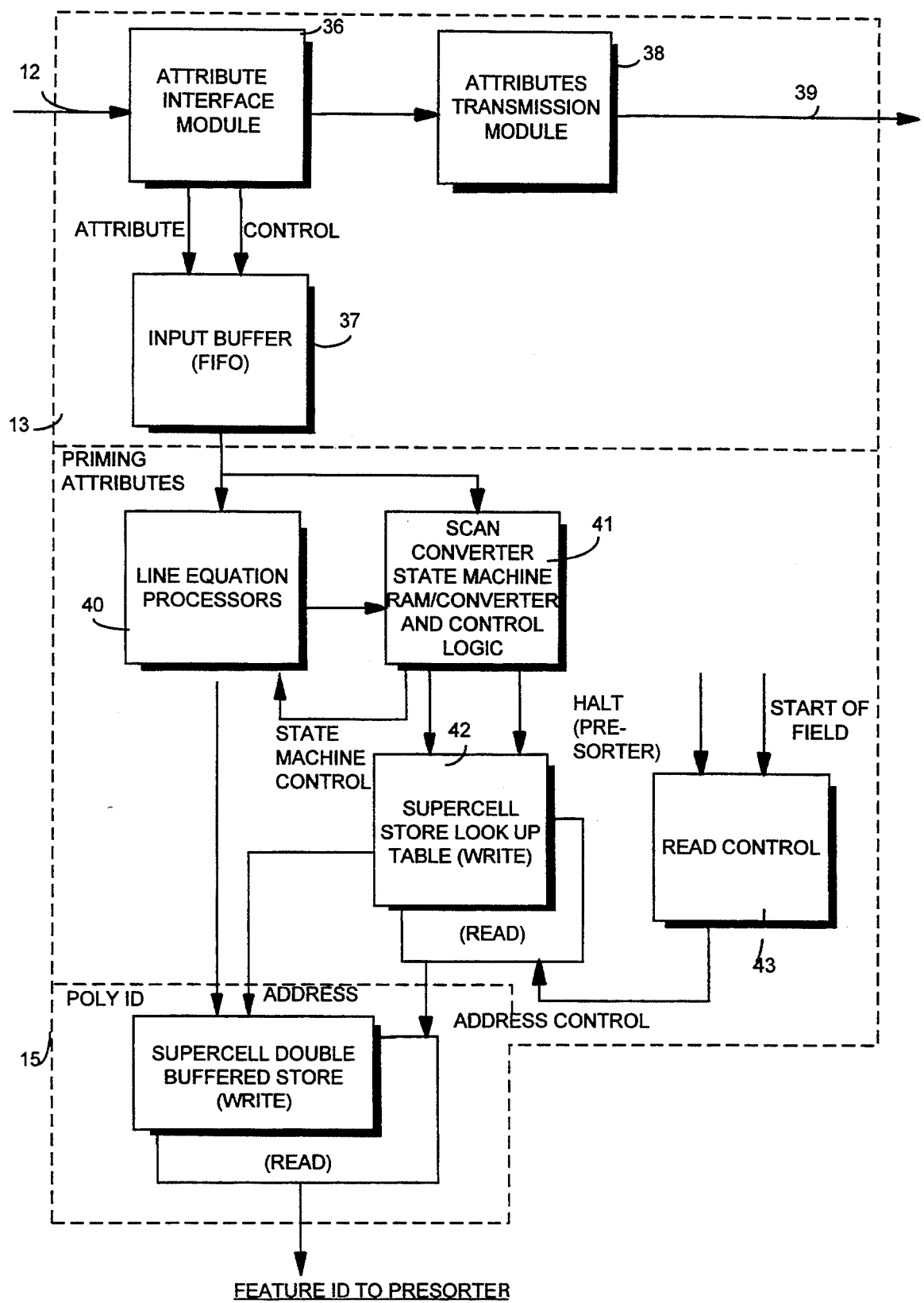
FIG. 6 illustrates a scan converter and store arrangement of the type described more generally with reference to FIG. 2.

FIG. 6 is a schematic illustration of the components of the scan converter 13 and supercell store 15 of FIG. 2. The scan converter store 15 stores data relevant to individual supercells. Attributes are received from the TE on input 12 (FIG. 2), one feature at a time, and an attribute interface module 36 inserts a feature ID into the data stream representing each feature for distribution to a scan converter input buffer 37 and an attribute transmission module 38 feeding an attribute bus 39 communicating with the attribute store 16 (FIG. 2).

The interface module 36 passes to the buffer 37 only geometrical attribute data necessary for the scan conversion processing. The buffer 37 allows the received data to be stored at optimum speed without it being necessary to slow down the flow of attribute data from the TE. The buffer output supplies the attribute data to an array 40 of line equation processors providing outputs to a state machine 41 that in turn controls the line equation processors. The components 40 and 41 correspond to the logic unit 14 of FIG. 2. A write coordinate look-up table 42 directs feature IDs to the appropriate location in the write section of the double-buffered supercell store. At the start of the next frame a read control unit 43 controls a read section of the coordinate table 42 to read data from the supercell store.

Each line equation processor is in the form of an identical application specific integrated circuit (ASIC) which can be controlled by the state machine 41. Each of these ASICs is referred to herein as a Dlet and performs a variety of functions depending on the mode selected. The detailed structure of each Dlet is of no great importance to an understanding of the present invention however and is therefore not described here.

It will of course be provided with the circuit components necessary to perform the simple arithmetical operations described below.

Three of the Dlets in array 40 share the task of deciding whether or not a feature bounding box impacts a supercell. The ID of each impacting feature is stored in the supercell store. The supercell store is schematically illustrated in FIG. 7 and it will be seen that it comprises a storage stack in respect of each supercell, each stack being capable of storing up to 256 feature IDs. Thus for the example quoted above, there are 64×64 stacks, and each stack stores a simple record (IDs only) of those features which impact the respective supercell.

Bounding Box Processing

Scan conversion of the bounding box of any feature starts from the bottom of the box, works in the x direction across the box until all the supercells between or overlapping the left and fight edges of the box have been identified, and then works upwards through the box one row of supercells at a time. The supercell being processed has unique centre coordinates in screen space and these are used to compute the distances dL, dR, and dT of the supercell centre ($x_{sc}$, $y_{sc}$) from the bounding box edges to left, right and top:

$dL = x_{sc} - L$
$dR = R - x_{sc}$
$dT = T - y_{sc}$

It is not necessary to calculate the distance to the bottom of the box as scan conversion starts at the bottom and always proceeds upwards.

Each of the three distances calculated as described above is compared to the distance from the supercell centre ($x_{sc}$, $y_{sc}$) to the supercell edges. In the example described above the supercell is square and thus it can be assumed that the supercell has dimensions of 2a square. Then, considering the left-hand edge of the bounding box:

If $dL < -a$, the supercell is to the left of the left bounding box edge. This is indicated by the generation of an outcode 01.

If $-a < = dL + a$, the supercell is the leftmost supercell in its row which is impacted by the bounding box. This is indicated by an outcode 10.

If $+a < dL$, the supercell is to the right of the left-hand edge of the bounding box. This is indicated by outcode 11.

Codes 01, 10 and 11 can be derived in this way for the left, right and top edges of the bounding box. Any one code 01 would indicate that the supercell was outside the bounding box. Any one code 10 would indicate a supercell intersected by one of the edges of the bounding box. This is used to control the direction of the bounding box scan efficiently. For example, a feature could have a bounding box as illustrated by the line 44 in FIG. 8. The grid illustrated in FIG. 8 indicates the relative disposition of the supercell boundaries relative to the bounding box 44. Supercells do of course overlap slightly but this is not indicated in FIG. 8. The scan converter can be arranged to go to the supercell within which the bottom left-hand corner of the bounding box is included, to progress in the positive x direction across the bounding box until an outcode 10 is produced as a result of the supercell then being processed overlapping the right-hand bounding box edge, to progress one step in the positive y direction and then in the negative x direction until an outcode 10 is produced for the left-hand edge of the bounding box, and so on. Thus in the case illustrated in FIG. 8 the scan converter will proceed through the supercells overlapped by the bounding box 44 in the order indicated by numbers 1 to 20.

The Rendering Engine

The RE 4 of FIG. 1 will now be described in outline with reference to FIG. 9. FIG. 9 shows the supercell store 15 and attribute store 16 of FIG. 2. It will be recalled that the supercell store and attribute store are both double-buffered, the contents of the stores being read out in response to receipt of a start of frame signal. The content of the supercell store is read out on output 45 supercell by supercell into a presorter 46 which also receives geometrical attribute data from the attribute store 16 on output 47. The presorter and attribute store provide respective outputs 48 and 49 to a special effects module 50, a colour mixer 51, and a postsorter 52. The postsorter 52 feeds raster image data to a frame store 53 and an output 54 from the frame store is delivered to the display device (display device 5 of FIG. 1).

The function of the presorter 46 is to subdivide each supercell into a series of pseudocells, to compute the effective depth (distance from the eyepoint) of each feature at each pseudocell corner, to detect any feature which is opaque and fully covers a pseudocell, and to discard any features from consideration in respect of any one pseudocell if such features lie behind an opaque feature fully covering that pseudocell. Thus given a pseudocell size which is four by four display pixels plus a half pixel boundary, each supercell ID list will be considered for each of sixteen pseudocells in turn.

The IDs accumulated in the supercell store 15 are downloaded to the presorter 46 one stack at a time. Corresponding attributes are simultaneously downloaded to the presorter from the attribute store 16. Thus the presorter receives the contents of one stack, corresponding to one supercell, and processes the features identified by the stack contents, before the next stack is downloaded.

If the presorter indicates that a feature impacts (at least partially covers) the pseudocell being processed, a "fragment" data packet is generated and applied to the fragment carrying output bus 48. This data packet comprises only the screen space coordinates of the four corners of the relevant pseudocell and the impacting feature ID. The fragments of features thus identified are then processed in the special effects module 50, the colour mixer 51, and the postsorter 52.

The units 50 to 52 operate on the basis of pseudopixels. In the illustrated case sixteen pseudopixels fully cover (but do not extend beyond) a respective pseudocell. The corners of the pseudopixels are interpolated from the corners of the relevant pseudocell carried by the fragment bus. The special effects module 50 generates, for each pseudopixel of the pseudocell being processed, an output appropriate to whatever special effects the attributes of the feature being processed demand, e.g. texture effects, fog effects, landing light effects. This output is applied to the colour mixer 51 where further effects such as ambient lighting are processed, the colour mixer delivering an RGBT (red, green, blue, translucency) output for each pseudopixel to the postsorter 52. The postsorter provides an output to the frame store 53. The frame store provides output 54 to the raster display device 5 (FIG. 1).

The function of the postsorter 52 is to resolve the effects of surfaces hiding or partially hiding other surfaces. It does this by assessing the impact of features on an array of sampling points, accumulating and weighting the effects of such impacts, and providing a final RGB output for each display pixel to the frame store. Each pseudopixel fragment received by the postsorter covers a respective array of sampling points distributed across the pixel array corresponding to each pseudocell. Typically there may be two hundred sampling points, that is eight per pixel. (It will be recalled that each pseudocell in the described example covers a four by four pixel array plus a half pixel wide boundary). The position of every sampling point relative to the four by four pseudopixel array defined for each pseudocell is known, and therefore it is necessary to decide, for each sampling point, whether or not a feature impacts that point, and only if impact is detected to accumulate the RGBT inputs to the postsorter from the corresponding pseudopixel.

Each sampling point may be overlapped by a large number of features and it is necessary to depth sort those features to discard those which are fully occulted by nearer (to the eyepoint) opaque features at that sampling point. To this end, the distance (from the eyepoint) of each feature at each sampling point is calculated. The RGBT and depth of the first feature impacting a sampling point is loaded into a respective store. Subsequent features are depth compared with the first stored feature, features being discarded from the store (or not entered) except for the current nearest opaque feature and translucent features nearer than the nearest opaque feature. Once all the features potentially relevant to a cell have been so processed, the cumulative effects of all the features identified in each stack are calculated to produce a final RGB output for each sampling point. Those outputs are then weighted and accumulated to produce a single RGB for each pixel. Each pixel will respond to contributions from the eight sampling points within its own boundary and sampling point within a half pixel wide border therearound, that is thirty-two sampling points in all ($1 \times 8 + 4 \times 4 + 4 \times 2$). The total area covering the thirty-two sampling points is thus equal to the area of a two by two pixel array but is centred on the centre of one display pixel.

The attribute store 16, supercell store 15, and frame store 53 are all double-buffered so as to define the boundaries between separate stages in the pipe-lined system.

Presorter

Turning now to the presorter 46 of FIG. 9, this receives feature IDs one at a time from the supercell store and decides which pseudocells in the respective supercell are impacted by the identified feature. The presorter receives the edge and bounding box equations for the identified features, and uses both inscribed polygon edges and bounding boxes to determine overlap of the elliptical feature with a pseudocell. The inscribed polygon enables complete coverage of a pseudocell by an opaque elliptical feature to be determined in a conservative manner.

For each feature ID, and for each of the sixteen pseudocells making up the respective supercell, the presorter decides whether or not the feature impacts the pseudocell, whether or not the feature completely covers the pseudocell, and if it does completely cover the pseudocell whether or not the feature is opaque. For each feature, the depth (distance from the eyepoint) of the corners of the pseudocell projected onto the plane of the feature are also calculated. Feature IDs are then stored as a list identifying the nearest opaque fully covering feature and any nearer partially covering opaque feature or partially or fully covering translucent feature.

For elliptical features the presorter calculates the perpendicular distance in screen space of each pseudocell corner to each edge of the inscribed polygon. The perpendicular distance d to an edge of the inscribed polygon is derived from:

$$d = ex + fy + g$$

where e, f and g are the coefficients of the line equation for that edge. The presorter also calculates the distance in screen space to each edge of the bounding box of the feature. The bounding box edge distances and the inscribed polygon edge distances are computed concurrently to determine pseudocell impact. Edge distance calculations are performed by a Dlet ASIC of the type described above with reference to the scan converter.

Figure 10:
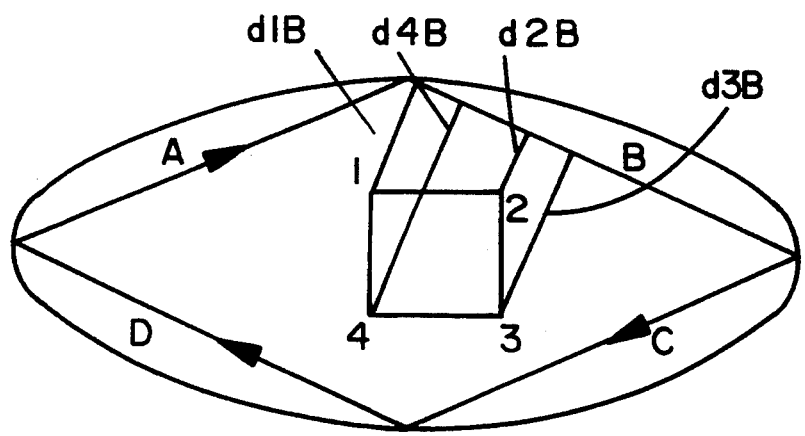
FIGS. 10 to 13 illustrate the processing of edge equations in a presorter which is a component part of the rendering engine.
Figure 11:
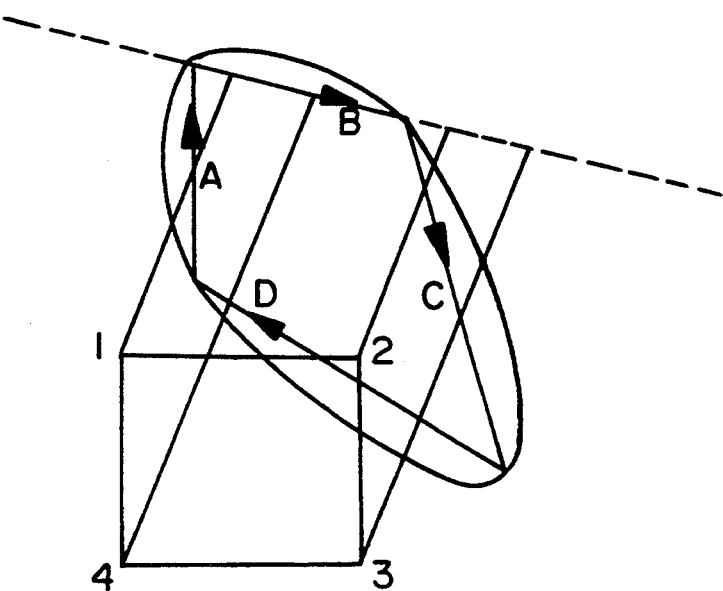
Figure 12:
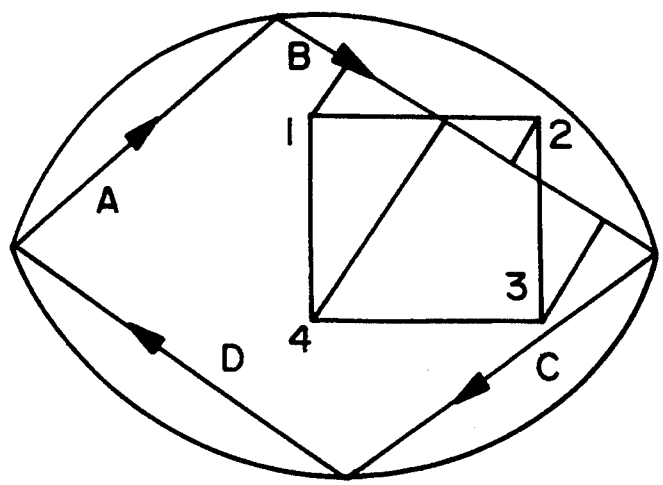

Assessing elliptical feature impact by reference to inscribed polygon edge distances is described with reference to FIGS. 10 to 12. Referring to FIGS. 10 to 12, a pseudocell has corners 1 to 4 and an inscribed polygon has edges A to D. By reference to the edge equations, the following distances (d values) are calculated:

d1A, d2A, d3A, d4A
d1B, d2B, d3B, d4B
d1C, d2C, d3C, d4C
d1D, d2D, d3D, d4D

FIGS. 10, 11 and 12 show distances d1B, d2B, d3B and d4B by way of example. In FIGS. 10 and 11, all the four d values are positive. In FIG. 12, d2B is negative, but d1B, d3B and d4B are positive. The sign of the distance depends upon whether the pseudocell corner is to the left or right of the line to which the distance relates.

Figure 13:
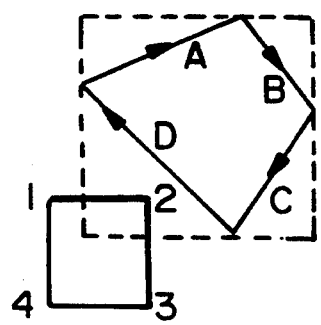

For all features, an equivalent set of sixteen distances are calculated by reference to the bounding box edges, that is the distance from each pseudocell corner to each bounding box edge. Thus in the example illustrated in FIG. 13, for corner number 2 of the pseudocell, the required d values correspond to the perpendicular distance from that corner to each of the four broken lines defining the bounding box.

Considering the four d values associated with one inscribed polygon edge, that is the distances from that edge to the four pseudocell corners, then the following conditions are distinguished between and indicated by the associated outcodes:

Each of the four d values positive or zero
outcode 11

All four d values negative or some negative and some zero
outcode 01

Any other combination (else)
outcode 10

The outcodes for the four edges are then combined by AND gates to produce total outcodes as follows:

| Total Outcodes | Significance |
| --- | --- |
| 11 | Feature totally covers pseudocell |
| 10 | Feature straddles (partially covers) pseudocell |
| 01 | Feature is outside pseudocell |
| 00 | Feature is outside pseudocell |

The d values from the bounding box edges to the pseudocell corners are processed in the same way as the d values for the edges of the inscribed polygon to provide outcodes 11, 01 or 10 for each bounding box edge, and total outcodes 11, 10, 01 or 00 for the combined bounding box edges. Thus two outcodes are produced, one (OCtot) for polygon edges and one (OCXtot) for bounding box edges.

The two total outcodes are combined to assert either "include" (feature to be passed on for further processing) or "total cover" (feature to be passed on for further processing and feature is opaque and covers all of pseudocell). Include is asserted only if:

OCXtot=1?

and

OCtot=1?

where ? is 1 or 0

Total cover is asserted only if:

The fragment is "included"

and

OCtot=?1 and

OCXtot=?1 and the fragment is not transparent where again ? is 1 or 0.

An elliptical feature is only considered to fully cover a psuedocell if its inscribed polygon fully covers the pseudocell. In some cases a feature which does fully cover a pseudocell will not be recognized as such, and as a result fragments which will not contribute to the final image may be processed unnecessarily. The system is conservative however in that no elliptical feature will be considered to fully cover a pseudocell when it does not do so. Visually apparent errors do not therefore result.

Figure 14:
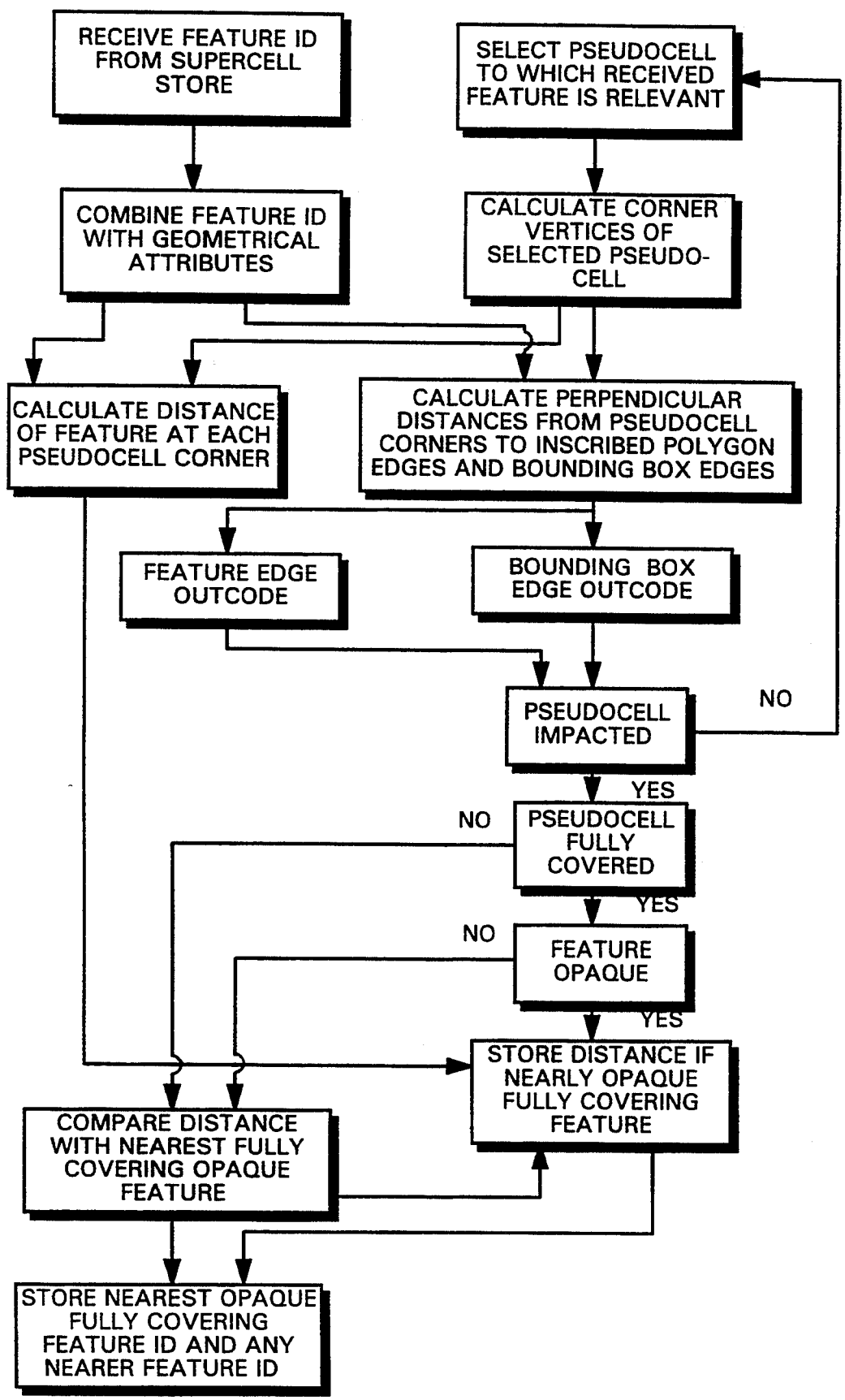
FIG. 14 is a flow diagram illustrating the processing of edge equations in the presorter.

FIG. 14 is a schematic flow diagram of the operation of the presorter. As mentioned above, in addition to analyzing pseudocell impact, the presorter also performs initial culling of feature fragments (i.e. discards those fragments that are definitely behind a totally opaque feature). For each pseudocell corner, the presorter calculates the depth of the feature then being processed. This requires an inverse perspective transformation which can be performed by a standardized ASIC as described below. The same ASIC is used throughout the system for inverse perspective transformations. The presorter receives as part of the feature attributes plane equation coefficients calculated in the TE. These are used to calculate inverse Z (the inverse of the eyepoint space Z coordinate of the point on the feature plane intersected by a line drawn from the eyepoint through the relevant pseudocell corner) at each pseudocell corner.

Thus four Z depths are computed for each feature, one depth for each pseudocell corner. Each of these four Z depths is then compared simultaneously with the respective one of the four Z depths of the nearest (to the eyepoint) previously processed fully covering opaque feature. If all the Z depths of the feature being processed are greater than those of the nearest fully covering opaque feature with which they are compared, then the feature being processed is culled. If all the Z depths of the feature being processed are less than those of the nearest fully covering feature with which they are compared, and the feature being processed is opaque, then the feature being processed replaces the previously processed fully covering opaque feature.

Figure 15:
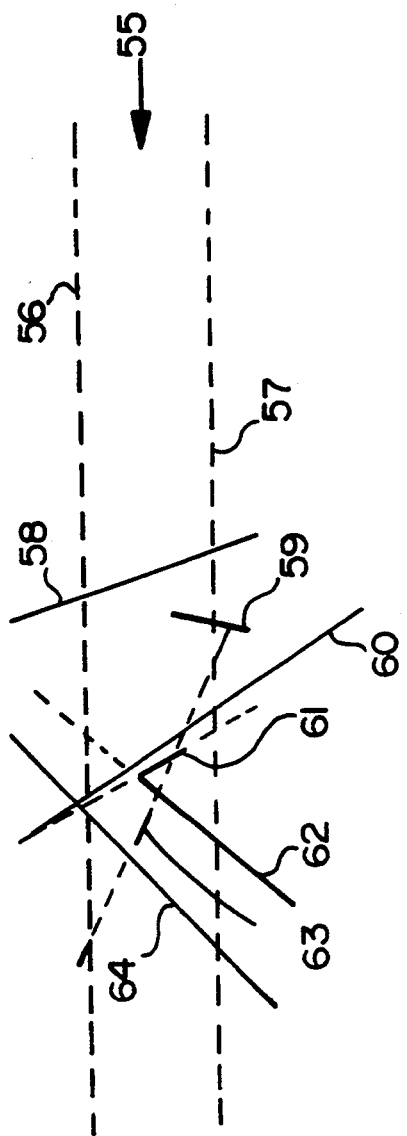
FIG. 15 illustrates the operation of the presorter in determining which features are occulted.

FIG. 15 illustrates the depth sorting of features in the presorter. The viewing direction is indicated by arrow 55. Broken lines 56 and 57 indicate top and bottom boundaries of a pseudocell. Lines 58 to 64 indicate features lying in planes perpendicular to the illustration. Feature 58 is not opaque, whereas features 59 to 64 are opaque. Feature 60 is the nearest fully covering opaque feature, but its Z value at line 56 is greater than that of the projection of feature 62 to line 56, and thus feature 62 is not culled. The Z value of feature 60 at line 57 is greater than that of the projection of feature 63, and thus feature 63 is not culled. Features 61 and 64 are culled.

Figure 16:
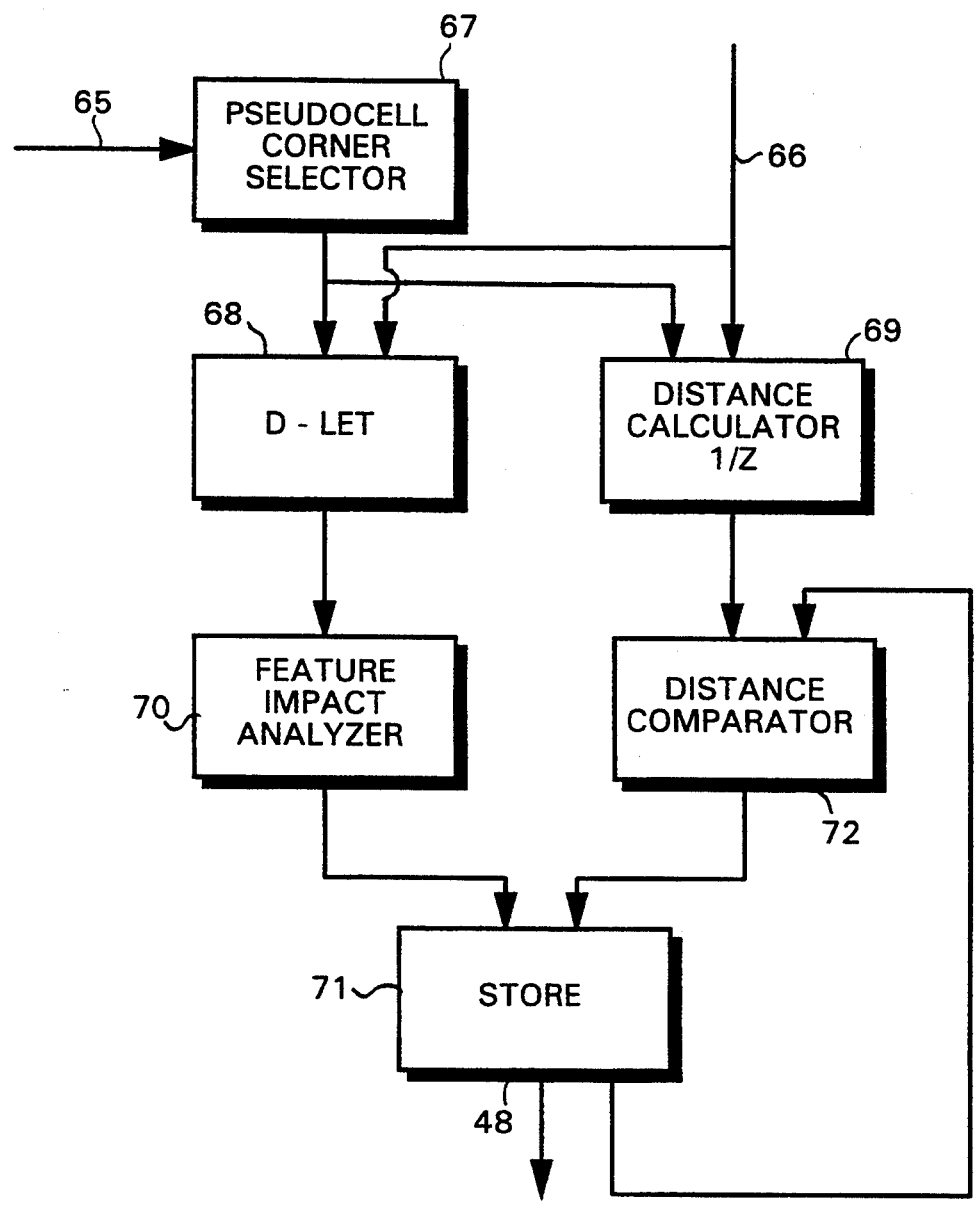
FIG. 16 is a schematic illustration of the structure of a presorter processor.

FIG. 16 schematically illustrates the presorter processor. Referring to FIG. 16, the presorter receives a series of impacting feature lists on input 65, each list corresponding to a respective supercell. The attribute data is also received on input 66 from the attribute store. The four corners (in screen space) of each pseudocell are determined by a selector 67. As described above, each pseudocell will correspond in area to sixteen pixels plus a half pixel wide border. In an ideal situation the basic cell would be square or rectangular, but distortion effects inherent in many display systems make the possibility of non-standard cell shapes highly desirable so that cells can be shaped so as to cancel out such effects. Thus a selected pseudocell might have four different x coordinates and four different y coordinates for its four corners.

The output of the selector 67 is applied to a Dlet 68 of the type described above and a distance calculator 69 which calculates the inverse distance (1/Z) of the four points on the plane of each feature corresponding to the corners of the pseudocell. For this calculation, it is assumed that the feature's plane covers all of the pseudocell. As described above, the Dlets perform thirty-two calculations for elliptical features, that is in respect of each corner of the pseudocell, the perpendicular distance from the corner to each edge of the inscribed polygon of the feature, and the perpendicular distance from that corner to each edge of the feature's bounding box.

An analyzer 70 decides whether or not a feature impacts the respective pseudocell as described above. If a feature impacts the pseudocell, its ID is loaded into a store 71 with its distance from the eyepoint at each pseudocell corner. A comparator 72 compares these distances with those of previously stored features and hidden features are culled from the store 71.

After each pseudocell is processed, the selected IDs are then output onto the fragment bus 48 (FIG. 9). The fragment bus carries the coordinates (in screen space) of the pseudocell corners and the feature IDs relevant to that pseudocell. From the pseudocell corner coordinates the corners of the sixteen pseudopixels making up the pseudocell are derived by bilinear interpolation.

Figure 17:
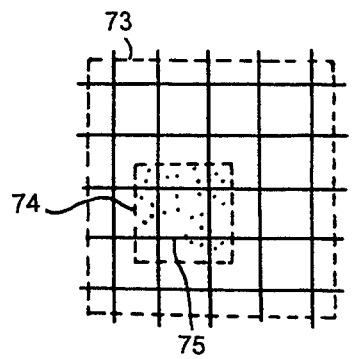
FIG. 17 illustrates the distribution of sampling points relative to a single pixel of the final display.

FIG. 17 illustrates the distribution of thirty-two sampling points relative to a single pixel of the final rendered image. In FIG. 17, the square outline indicated by broken line 73 represents a single pseudocell boundary. The square broken line 74 represents the perimeter of an area enclosing thirty-two sampling points, samples from each of those thirty-two sampling points being relevant to the final RGB value allocated to the pixel positioned centrally within the area outlined by broken line 74. One edge of the pixel is indicated by numeral 75. The dots within the area enclosed within line 74 represent individual sampling points. The positions of these sampling points relative to the pseudocell boundaries are fixed for each frame but may be altered (dithered) from one frame to the next if stochastic sampling is required. It will be seen that there are eight sampling points within the perimeter of the pixel in question, four sampling points in each of the abutting half pixel areas, and two sampling points in each of the abutting quarter pixel areas. The number of sampling points per pixel will of course be selected to suit the particular performance requirements of the system. Increasing the number of sampling points will increase the quality of the final image.

The Special Effects Module

The special effects module 50 (FIG. 9) receives fragment data from the presorter 46 and attribute data from the attribute store 16. The module 50 is made up from a series of subsystems 78 to 81 each handling one special effect, e.g. texture effects, fog, landing lights and shading. Of course, provision may be made for other special effects. Each of the subsystems produces a respective output for each pseudopixel of the pseudocell being processed. Pseudocells are processed one at a time as they come in on the fragment bus from the presorter.

The Colour Mixer

The colour mixer 51 (FIG. 9) receives fragment data from the presorter 46, attribute data from the attribute store 16, and the outputs of the special effects module. Within the colour mixer are subsystems that combine the various inputs to achieve desired effects. These subsystems may comprise an array of processors each allocated a particular task. The detailed relationship between the various subsystems and the inputs to the colour mixer is not germane to the present invention. It is simply necessary to appreciate that the colour mixer provides an output which includes an RGBT value for each pseudopixel of the pseudocell being processed. That output is delivered to the postsorter 52.

The Postsorter

Figure 18:
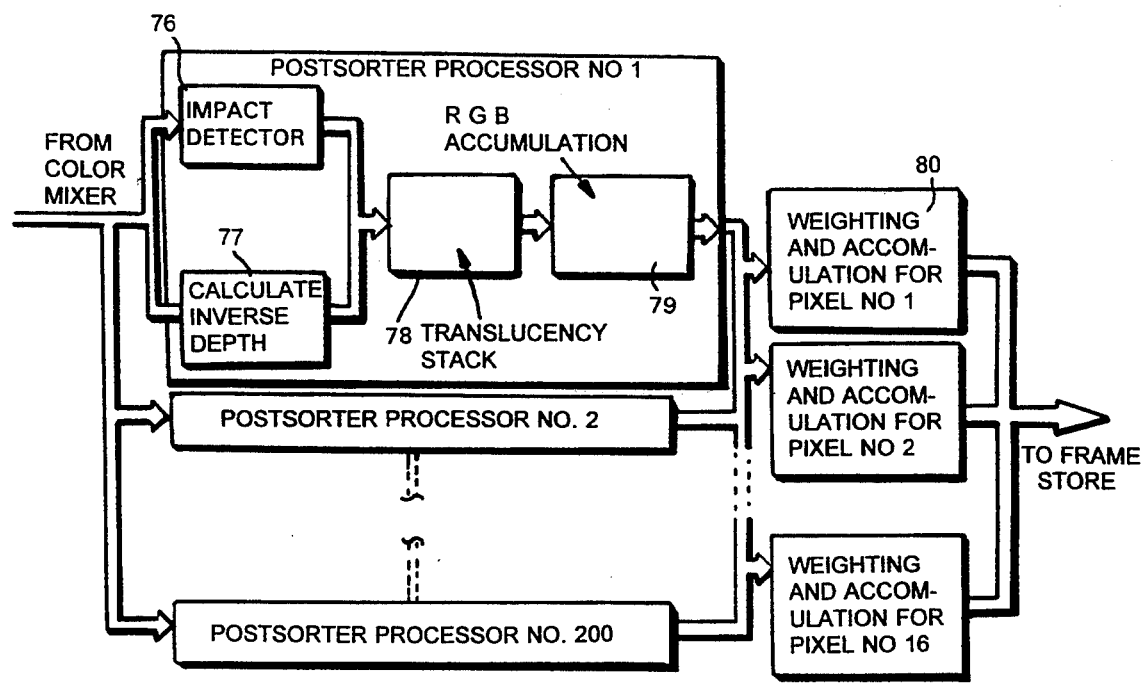
FIG. 18 is a schematic block diagram of a post-sorter which receives the output of the presorter referred to above.
Figure 19:
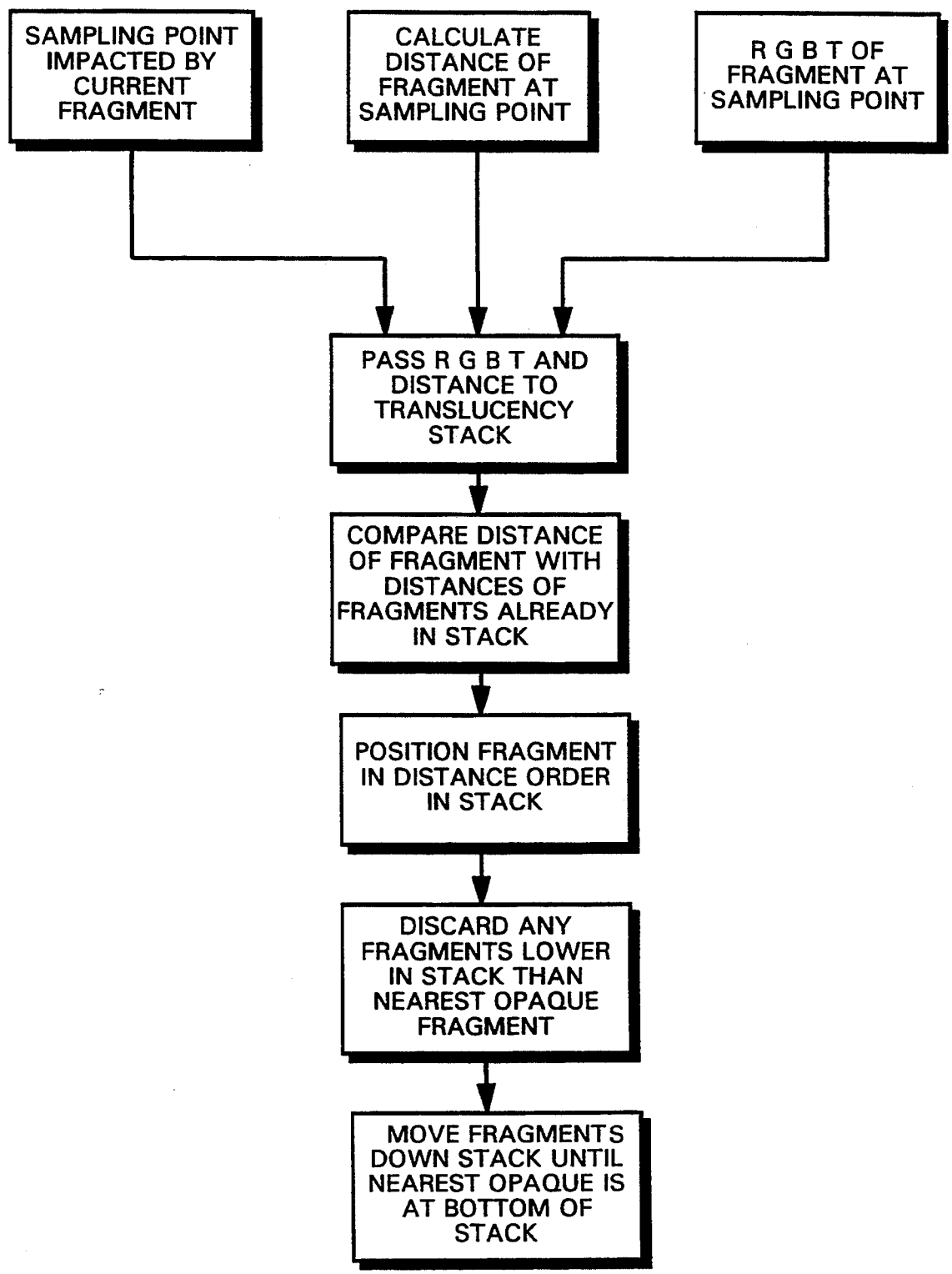
FIG. 19 is a flow diagram illustrating the operation of the post-sorter.

Referring now to FIG. 18, this schematically illustrates the structure of the postsorter. One postsorter processor is provided for each sampling point (200 per pseudocell). Each postsorter comprises a sampling point impact detector 76, an inverse Z depth calculator 77, a translucency stack 78 and an accumulator 79. The outputs of the postsorter processors are weighted and accumulated by circuits 80, one of which is provided per pixel, that is sixteen per pseudocell. The operation of the postsorter is illustrated in FIG. 19.

Each postsorter processor receives the geometrical attributes of each feature identified as impacting the relevant pseudocell, plus the RGBT value produced by the colour mixer for the pseudopixel within which the sampling point is positioned. The appropriate pseudopixel data is selected for each sampling point by reference to the position of the sampling point relative to the pseudocell. Completely transparent samples are discarded so as to avoid cluttering the translucency stacks.

For each psudocell, sixteen RGBT values for the sixteen pseudopixels covering that pseudocell are input into the postsorter from the colour mixer. Each postsorter processor is arranged to receive four pseudopixel values for the quadrant containing the sampling point, one quadrant being a quarter of a pseudocell, that is 2×2 pseudopixels. However, each processor is programmed to ignore all but the single RGBT value for the pseudopixel containing that processor's sampling point. Each pseudopixel area contains either 12 or 13 sampling points, each quadrant area containing 50 sampling points, and each abutting pair of pseudopixels containing 25 sampling points.

Sampling Point Impact Assessment

For elliptical features, the impact detector does not rely upon the line equations of the inscribed polygon as to do so would result in the loss of peripheral regions of the feature. Impact assessment is based rather upon a true analysis of the elliptical (in world space) boundary of the feature.

Elliptical features include in their attributes major and minor axes U, V which are vectors in world space and intersect at the centre (origin) of the feature. The magnitudes of these vectors are representative of the lengths of the major and minor axes a and b. The TE 3 (FIG. 1) transforms the coordinates of the origin and U, V axes to eyepoint space. An inverse perspective transformation (IPT) is then performed to determine the U, V coordinates of each sampling point.

Figure 20:
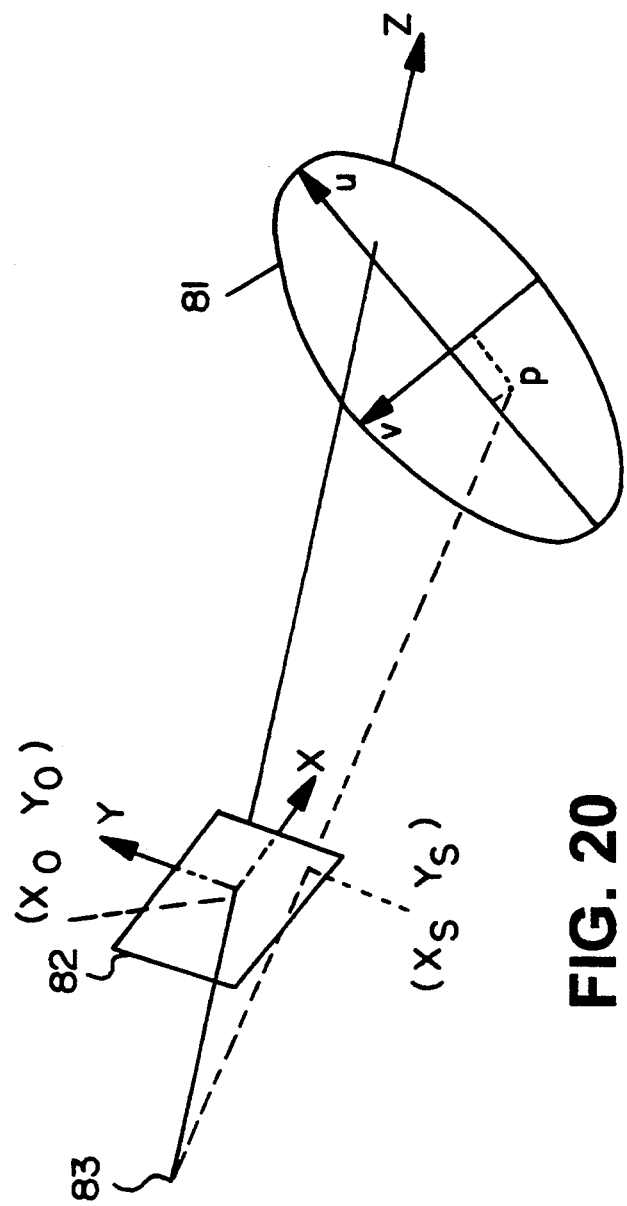
FIG. 20 illustrates the way in which the impact of an elliptical feature on a sampling point is assessed.

FIG. 20 illustrates the basic geometry. An elliptical feature 81 is viewed through a viewing plane 82 from eyepoint 83. The plane equation of the feature is known from the received attributes, and thus the (x, y, z) coordinates in eyepoint space of any point P on the feature can be calculated from the equation:

$$z = -D/(Ax_s/d_x + By_s/d_y + C)$$

where A, B, C and D are the elliptical features plane equation coefficients $d_x$ and $d_y$ are functions of the half angle of the display (it is assumed here that the display is square)

$x_s y_s$ are the screen space coordinates of a line drawn from the eyepoint to the point P, and The x and y coordinates in eyepoint space can also be readily calculated from:

$$x = zx_s/d_x$$

$$y = zy_x/d_y$$

It should be noted that these same equations are used throughout the system where appropriate, e.g. in the presorter for Z-depth feature sorting, and may be performed by a dedicated ASIC.

Having calculated the eyepoint space coordinates (x, y, z) of the point P, the point P must be transformed into U, V space. Firstly the vector offset from the feature origin is calculated:

$$x_{offset} = x - x_{p0}$$

$$y_{offset} = y - y_{p0}$$

$$z_{offset} = z - z_{p0}$$

where ($x_{p0}$, $Y_{p0}$, $z_{p0}$) defines the feature origin in eyepoint space.

Secondly, the components of this vector offset along the U, V axes of the elliptical feature are calculated from the vector dot products of the offset vector with each of the axes U and V. This yields:

$$u = u_x \cdot x_{offset} + u_y \cdot y_{offset} + u_z \cdot z_{offset}$$

$$v = v_x \cdot x_{offset} + v_y \cdot y_{offset} + v_z \cdot z_{offset}$$

where $(u_x, u_y, u_z)$ define the U axis $(v_x, v_y, v_z)$ define the V axis

Substituting in values of $x_{offset}, y_{offset}$ gives:

$$u = u_x \cdot x + u_y \cdot y + u_z \cdot z - (u_x \cdot x_{p0} + u_y \cdot y_{p0} + u_z \cdot z_{p0})$$

$$v = v_x \cdot x + v_y \cdot y + v_z \cdot z - (v_x \cdot x_{p0} + v_y \cdot y_{p0} + v_z \cdot z_{p0})$$

or:

$$u = (u'_x x_s + u'_y y_s + u'_z)z - u_o$$

$$v = (v'_x x_s + v'_y y_s + v'_z)z - v_o$$

where $$u'_x = u_x / d_x$$

$$v'_x = v_x / d_x$$

$$u'_y = u_y / d_y$$

$$v'_y = v_y / d_y$$

$$u'_z = u_z$$

$$v'_z = v_z$$

$$(u'_x, u'_y, u'_z)$$

and $$(v'_x, v'_y, v'_z)$$

and $u_o$ and $v_o$ are constants that are fixed for any particular field and thus can be computed in the TE 4 (FIG. 1).

Thus u and v at any sampling point may be calculated. In practice it is more efficient to calculate u, v at each pseudocell corner and to calculate the u, v values at each sampling point by interpolation of the pseudocell corner values.

Having calculated u, v values for each sampling point, it is a simple matter to determine whether a sampling point is impacted. For u, v values $(u_{sp}, v_{sp})$ at a sampling point for an elliptical feature having major axis dimension a and minor axis dimension b, then if:

$$(u_{sp}/a)^2 + (v_{sp}/b)^2 \leq 1$$

impact has occurred.

Figure 21:
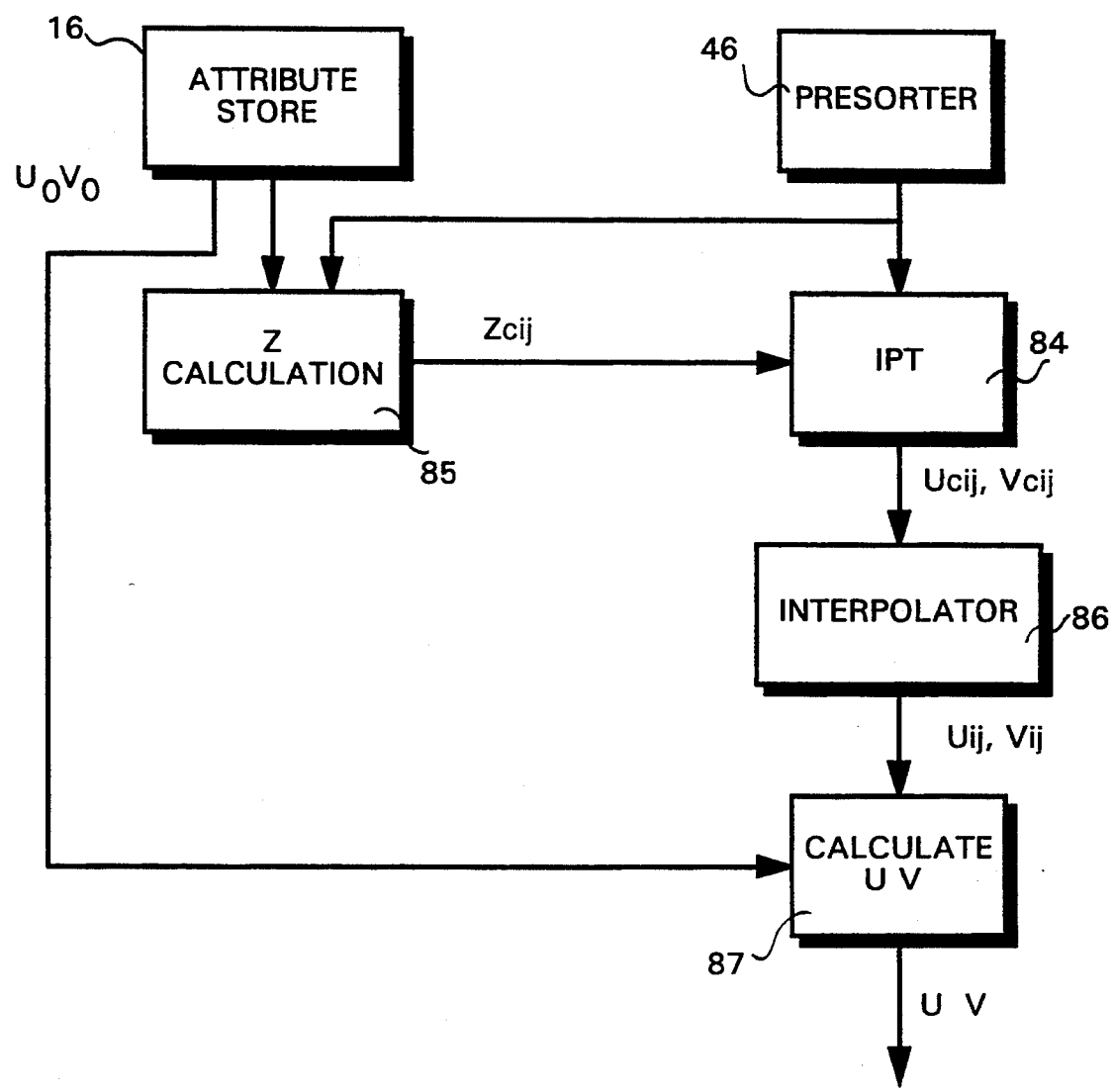
FIG. 21 illustrates in functional terms the calculation of coordinates required to assess sampling point impact.

FIG. 21 illustrates the functional blocks responsible for z calculation and u, v coordinate calculation. The subsystem comprises an inverse perspective transformation device (IPT) 84 which receives fragment data from the presorter and a z calculator 85 which receives fragment data from the presorter and geometrical attribute data from the attribute store. The z calculator outputs $z_{cij}$, that is the distance to the feature at points corresponding to the pseudocell corners. The IPT calculates u, v values at each pseudocell corner to produce outputs $u_{cij}, v_{cij}$. These u,v values are used by interpolator 86 to produce u,v values $u_y, v_y$ at each sampling point using bilinear interpolation, and knowing the relative position of the sample point within the pseudo-cell. The constants $u_o, v_o$ are introduced via calculator 87.

Having determined that an elliptical fragment impacts a particular sampling point, the z-depth is calculated at that sample point using the plane equation of the fragment and the absolute position of the sample point.

The impacting fragment inverse depth is passed to the translucency stack 78 (FIG. 18) with the RGBT values. The stack can store for example eight entries each containing the RGBT and 1/Z for one feature fragment. When a translucent (at the particular sampling point) feature fragment is presented to the stack, its 1.Z is compared with all existing entries in the stack. Assuming no earlier entries, the first translucent feature is stored in position eight in the stack, its position being indicated by a "top of stack" pointer pointing to position eight. The next (second) translucent fragment is depth compared with that in position eight. The two fragments are stored in positions seven and eight, with the nearest fragment in position seven. The stack pointer then points to position seven. If a fragment is received which, at the sampling point, is opaque, that fragment is correctly positioned in the stack in depth order and then moved down the stack to position eight (if not already in position eight). Any entries beneath it in the stack are discarded, and any entries above it are moved down with it so that the depth order is maintained. The stack pointer keeps track of the nearest (top of the stack) fragment.

Each postsorter processor thus produces a list of fragments in depth order, with each having an associated RGB and T value. The final colour contribution of each sampling point is then calculated in the accumulator 79. Assuming that there are seven translucent fragments having translucencies of T0, T1 . . . T6, and that the seven translucent and one opaque fragments have colours R0G0B0, R1G1B1 . . . R7G7B7, the cumulative translucency in front of the nth translucent fragment is:

$$cTn = T_0 \times T_1 \times \ldots \times T_{n-1}$$

Each final colour component (R, G, B) is then calculated as follows:

$$R = (cT0 \times R0) + (cT1 \times R1) + \ldots (cT7 \times R7)$$

$$G = (cT0 \times G0) + (cT1 \times G1) + \ldots (cT7 \times G7)$$

$$B = (cT0 \times B0) + (cT1 \times B1) + \ldots (cT7 \times B7)$$

Thus, each sampling point processor produces a single RGB value and it is from a weighted summation of these values that the final pixel RGBs are formed.

For each pixel of the final image, thirty two sampling points are relevant, that is the eight sampling points within that pixel, plus the twenty four sampling points in a half pixel wide boundary around the pixel. Sampling points are allocated different weights as sampling points near to the centre of the pixel should have more effect than sampling points close to the edge of the pixel boundary. Each sampling point will contribute to four different pixels and will have a different weighting for each pixel to which it contributes, the weighting being a function of the distance from the sampling point to the relevant pixel centre.

Each weighting and accumulator device 80 takes the outputs from thirty two postsorter processors, applies the appropriate weightings, sums the results, and outputs the sum to the respective pixel address in the frame store. All sixteen pixels in the cell are processed concurrently by the sixteen weighting and accumulator devices, and then the data relevant to the next cell of sixteen pixels is released to the postsorter. The process is then repeated until all the cells of all the supercells have been processed. The completed frame can then be downloaded for display.

Thus the described system enables the screen space boundaries of world space elliptical features to be precisely determined. The inscribed polygon enables full coverage of screen space areas by elliptical features to be determined, and the circumscribed polygon enables screen space areas not overlapped at all by elliptical features to be identified. Given the use of circumscribed and inscribed polygon to assess area coverage, a system capable of processing world space polygonal features can be readily adapted to process world space elliptical features in an efficient manner using the present invention, without it being necessary to break up elliptical features into a series of polygons. Such a system capable of processing world space polygon features is described in International Patent Application No. PCT/GB/89/01451.

I claim:

1. A method for generating data representative of an image of a world space model to be displayed on a screen, the model being defined by a plurality of features including at least one feature having an elliptical boundary, and the image being intended to present a view of the model from a predetermined eyepoint in world space wherein said method comprises the steps of:
   a. storing attribute data describing said at least one feature, the attribute data including two axes and an origin describing the major and minor axes of the elliptical boundary of said feature in world space coordinates, and a magnitude a and b representing the length of said major and minor axes;
   b. transforming said attribute data from world space coordinates to eyepoint space coordinates;
   c. determining the positions of a plurality of sampling points in screen space;
   d. determining the position for each said sampling point of a point of intersection between a line drawn from the eyepoint through the sampling point and a plane defined by said two axes;
   e. calculating the coordinates of each said point of intersection of the plane in a coordinate system defined by said two axes and said origin and calculating said coordinates in eyepoint space;
   f. identifying each sampling point for which the respective coordinates lie within the elliptical boundary by calculating a vector offset for each said point of intersection of the plane from the origin, calculating components u, v of the calculated vector offset along the major and minor axes for each said point of intersection of the plane by using the vector dot products of the offset vector with each of the major and minor axes such that each point of intersection is considered to lie within the elliptical boundary if $(u/a)^2 + (v/b)^2 <= 1$; and
   g. generating for each identified sampling point a sampling point output including attributes of said at least one feature.

2. A method according to claim 1 further comprising the steps of dividing the screen into a plurality of sub-areas, storing attribute data describing vertices in world space of a polygon circumscribing said at least one feature, transforming the stored vertices into screen space coordinates, and assessing the sub-area impact by said at least one feature by reference to said screen space coordinates of said vertices.

3. A method according to claim 2, wherein each sub-area is rectangular and limited by edges, each of which edges extends parallel to one of a pair of screen space coordinate axes, and comprising the steps of calculating screen space coordinates of a bounding box for said at least one feature, the bounding box being rectangular with each of its edges being parallel to one of the screen space coordinate system axes, and having each vertex thereof lying on an edge of the bounding box, and identifying said at least one feature as potentially overlapping any sub-area which overlaps the bounding box.

4. A method according to claim 1 further comprising the steps of dividing the screen into a plurality of sub-areas, calculating screen space vertices for an inscribed polygon with each vertex of the polygon lying on the elliptical boundary of said at least one feature, deriving line equations which describe the edges of the polygon, determining the position of each corner of a sub-area relative to each edge of the polygon, and identifying said at least one feature as fully covering the sub-area if each corner of the sub-area is within an area defined by the edges of said polygon.

5. A method according to claim 4, comprising the steps of calculating said vertices of said polygon by determining the world space coordinates of the four points of intersection between said major and minor axes and the elliptical boundary, and transforming the world space coordinates to screen space coordinates.

6. A method according to claim 5 comprising calculating the perpendicular distance of each corner of a sub-area from each of the edges of the inscribed polygon and assessing full sub-area coverage by reference to said calculated distances.

7. A method according to claim 4, comprising calculating the perpendicular distance of each corner of a sub-area from each of the edges of the inscribed polygon and assessing full sub-area coverage by reference to the calculated distances.

8. An image generator for generating data representative of an image of a world space model to be displayed on a screen, the model being defined by a plurality of features including at least one feature having an elliptical boundary, and the image being intended to present a view of the model from a predetermined eyepoint in world space, wherein the image generator comprises:
   a. means for storing attribute data describing said at least one feature, the attribute data including two axes and an origin which describe the major and minor axes of the elliptical boundary of said feature in world space coordinates, and a magnitude a and b representing the length of said major and minor axes;
   b. means for retrieving said attribute data from said storage means and transforming said attribute data from world space coordinates to eyepoint space coordinates;
   c. means for determining the positions of a plurality of sampling points in screen space;
   d. means for determining the position for each said sampling point of a point of intersection between a line drawn from the eyepoint through the sampling point and a plane defined by said two axes;
   e. means for calculating the coordinates of each said point of intersection of said plane in a coordinate system defined by said two axes and said origin and calculating said coordinates in eyepoint space;

f. means for identifying each sampling point for which the respective coordinates lie within the elliptical boundary by calculating a vector offset for each said point of intersection of the plane from the origin, calculating components u, v of the calculated vector offset along the major and minor axes for each said point of intersection of the plane by using the vector dot products of the offset vector with each of the major and minor axes such that each point of intersection is considered to lie within the elliptical boundary if $(u/a)^2 + (v/b)^2 <= 1$; and g. means for generating for each identified sampling point a sampling point output including attributes of said at least one feature.

* * * * *